Patented May 19, 1925.

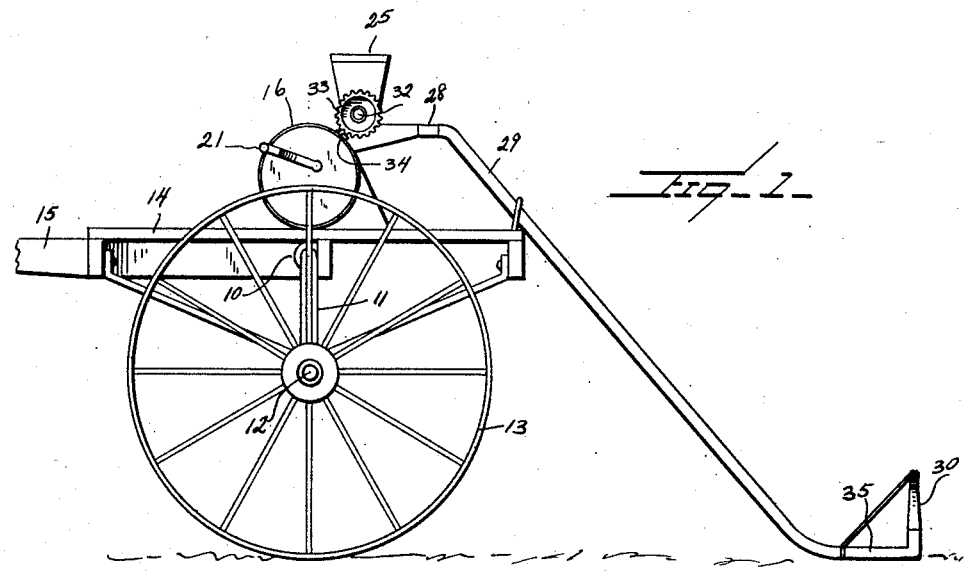
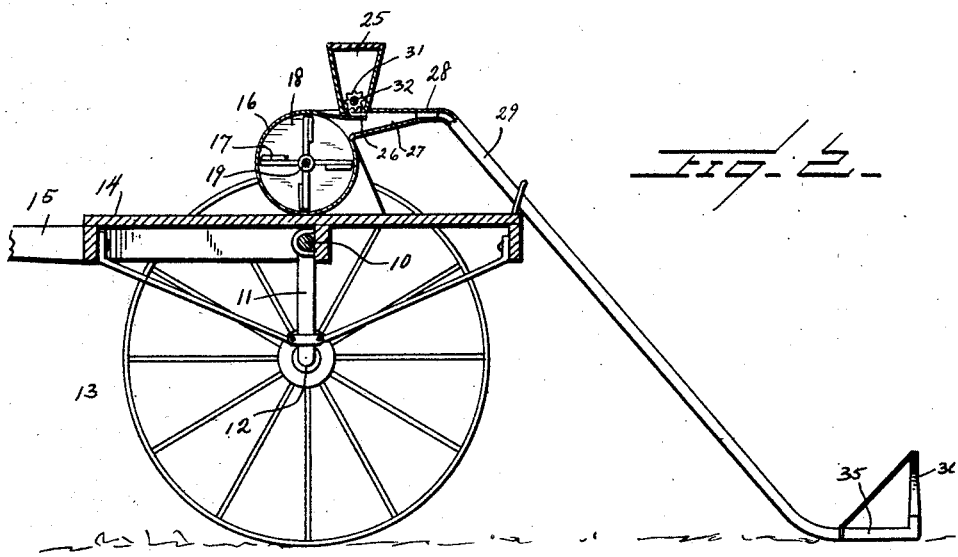

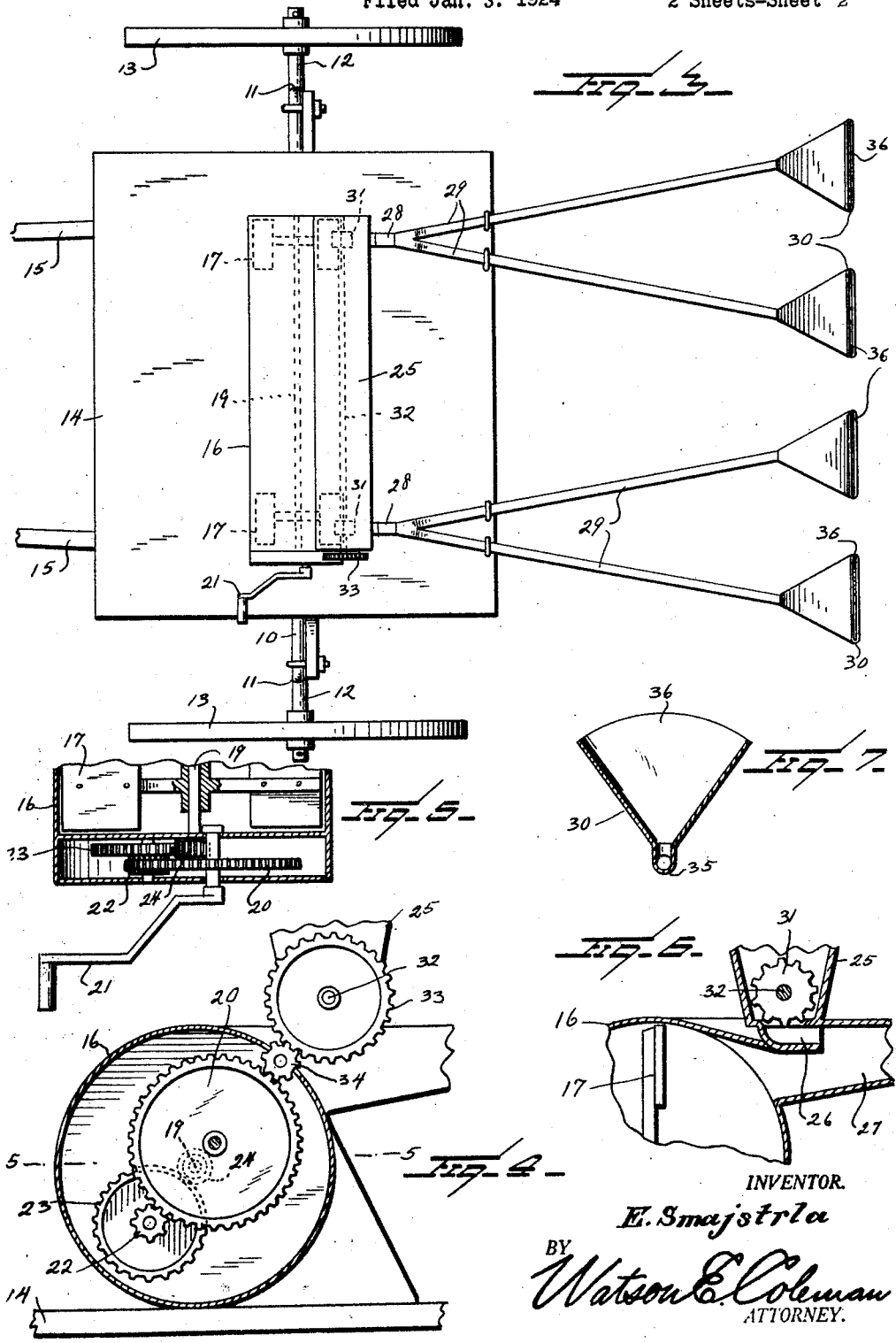

1,538,221

UNITED STATES PATENT OFFICE.

EMIL SMAJSTRLA, OF VICTORIA, TEXAS.

INSECT DESTROYER.

Application filed January 3, 1924. Serial No. 684,239.

*To all whom it may concern:*

Be it known that I, EMIL SMAJSTRLA, a citizen of the United States, residing at Victoria, in the county of Victoria and State of Texas, have invented certain new and useful Improvements in Insect Destroyers, of which the following is a specification, reference being had to the accompanying drawings.

This invention relates to implements for destroying boll weevils and other insects, and more particularly it relates to that class of insect destroyers in which means is provided for scattering poison upon the plants.

Boll weevils or leaf worms breed upon the under side of the leaves. They feed upon the leaves first, then go to the squares, from there to the small bolls and then to the large ones. Cotton first begins to put on squares at the bottom of the stalk and there the first squares form which later develop into blooms and then into bolls. The boll worms feed upon the leaves first and then go to the stalk where the sun rays do no not penetrate. Means which spray poison upon the top surface of the leaves or toward the top of the plant cannot be a success for the reason above stated, and the general object of my invention is to provide a machine which is so constructed that the poison will be blown upward through all of the foliage and toward the under surfaces of the leaves, branches and other parts of the plant where the insect breeds and lodges.

A further object is to provide a device of this character comprising a hopper for containing powdered poison, one or more blowers, and one or more pairs of spraying tubes ending in spraying nozzles which are adapted to be disposed more or less close to the ground, the nozzles being turned upward and widened, each at its upper end so as to cause the poison to be discharged in a fan-shaped sheet or spray against the cotton plants and particularly against the under faces of the leaves and other foliage.

A still further object is to provide a mechanism of this character which is very simple, very light, may be easily operated and may be either run by hand or by power derived from one of the traction wheels of the machine.

Other objects will appear in the course of the following description.

My invention is illustrated in the accompanying drawings, wherein:—

Figure 1 is a side elevation of an insect destroying machine constructed in accordance with my invention;

Figure 2 is a vertical sectional view therethrough;

Figure 3 is a top plan view;

Figure 4 is an enlarged section through the gear housing showing the gears for transmitting power from the axle to the feeding devices;

Figure 5 is a horizontal section on the line 5—5 of Figure 4;

Figure 6 is a fragmentary vertical section through a portion of the blower casing and nozzle leading therefrom and the hopper;

Figure 7 is a sectional view through one of the discharge nozzles.

Referring to these drawings, 10 designates an arched axle whose ends are downwardly turned, as at 11, and then outwardly extended, as at 12, to form knuckles supporting the wheels 13. Operatively supported upon this axle in any suitable manner is a supporting platform 14, from which extend rearwardly projecting handles 15. Mounted upon the supporting frame is a blower casing 16 within which is disposed a pair of rotatable blowers or fans, designated 17. The blower casing is separated into two compartments by a transverse partition 18 and there is one of these blower fans in each of these compartments. I do not wish to be limited to any particular construction for the fan, as it is obvious that it might be made in any desired way.

Extending through the housing 16 is a longitudinal shaft 19 upon which the blowers 17 are mounted. This shaft may be driven in any suitable manner, but I have provided for this purpose a main gear wheel 20 having a crank 21 whereby it may be operated, this main gear wheel engaging with a pinion 22 mounted upon a stub shaft carrying a large gear wheel 23, which in turn engages a pinion 24 mounted upon the shaft 19. Thus it will be obvious that as the crank 21 is turned the fan or blower shaft will also be rotated and that this may be rotated at a relatively high speed.

Mounted above the fan casing 16 is a hopper 25 within which the powdered poison is to be disposed. Extending from the bottom of this hopper at two or more places as desired is a duct or pipe 26 which is illustrated as opening into a duct or pipe 27, in turn opening into the fan casing. These conjoined ducts or pipes 26 and 27 open into a relatively short tubular section 28, which in turn opens into twin pipes 29 each leading to a nozzle 30. Disposed immediately over the opening of each pipe 26 is a toothed distributing wheel 31. These wheels 31 are mounted upon a transverse shaft 32 which is mounted in suitable bearings within the end walls of the powder box 25, and at one end of this shaft there is a gear wheel 33 which engages with a pinion 34, in turn meshing with the crank gear wheel 20. Thus as the crank is turned to rotate the blowers, the distributer wheels will also be rotated and will cause the distribution of the powder to the pipes 26, and the blast of air passing through the pipe 27 will draw the powder down the duct 26 and eject it out into the pipes 29. The pipes 29 extend downward and forward and there are two pairs of these pipes, each pair being adapted to straddle a row. The downwardly extending pipes 29 at their lower ends are extended rearward horizontally, as at 35, this horizontal portion being disposed about six inches from the ground, and then extend upward into the nozzle 30. The nozzle 30 is fan-shaped and has a relatively wide mouth 36 through which the air and powdered poison are discharged upward against the under sides of the plants. Inasmuch as there are two of these nozzles 30 for each plant and operating on opposite sides of a row and adjacent the stalk of a plant, it follows that each plant will be thoroughly powdered and that the powder will be discharged upward against the under faces of the leaves and against the stalk itself and against the small squares and bolls.

Actual tests with a machine of this character show that the blowing of the powder against the under faces of the plant will very greatly reduce the loss from boll weevils and the like.

While I have illustrated a construction of this character wherein the fans and poison feeding devices are driven by hand, that is by rotating the crank 21, it is obvious that this crank shaft 21 might be driven directly from one of the tractor wheels 13. It is also obvious that many changes might be made in the details of construction and arrangement of parts without departing from the spirit of the invention.

While I have heretofore referred to this device as being used for the purpose of killing boll weevils, I wish it understood that it may be used for the purpose of destroying all sorts of worms upon plants and not only the boll worm and leaf worm but any other worms that might infest the same, but it is particularly adapted for boll worms and leaf worms because of the fact that these worms habitually infest the under sides of the leaves of plants and the under sides of the stalks and can only be reached by spraying upward against the leaves.

I claim:—

A poison distributing machine comprising a wheeled supported frame, a hopper mounted upon the frame, discharge pipes extending downward from the hopper, the discharge pipes at their terminal ends being bent upward and formed with upwardly extending nozzles, and a fan blower mounted upon the frame and discharging into the discharge pipes.

In testimony whereof I hereunto affix my signature.

EMIL SMAJSTRLA.